(12) United States Patent
Liu et al.

(10) Patent No.: US 7,122,763 B1
(45) Date of Patent: Oct. 17, 2006

(54) THERMOS BAG

(75) Inventors: Chih-Hsiang Liu, Changhua (TW); Shu-Fen Li, Changhua (TW)

(73) Assignee: J Sheng Co., Ltd., Changhua Hsien (TW)

( * ) Notice: Subject to any disclaimer, the term of this patent is extended or adjusted under 35 U.S.C. 154(b) by 0 days.

(21) Appl. No.: 11/193,252

(22) Filed: Aug. 1, 2005

(51) Int. Cl.
*H05B 3/00* (2006.01)

(52) U.S. Cl. .................. 219/214; 219/386; 219/387
(58) Field of Classification Search .......... 219/214, 219/386, 387
See application file for complete search history.

(56) References Cited

U.S. PATENT DOCUMENTS

| | | | | |
|---|---|---|---|---|
| 3,746,837 A * | 7/1973 | Frey et al. | ............ | 219/387 |
| 3,869,595 A * | 3/1975 | Collins et al. | ............ | 219/387 |
| 4,759,190 A * | 7/1988 | Trachtenberg et al. | ....... | 62/3.62 |
| 5,060,479 A * | 10/1991 | Carmi et al. | ............ | 62/3.62 |
| 5,301,508 A * | 4/1994 | Kahl et al. | ............ | 62/3.62 |
| 5,646,455 A * | 7/1997 | Price | ............ | 307/10.1 |
| 5,860,281 A * | 1/1999 | Coffee et al. | ............ | 62/3.62 |
| 6,301,901 B1 * | 10/2001 | Coffee et al. | ............ | 62/3.7 |
| 6,541,738 B1 * | 4/2003 | Casasola | ............ | 219/387 |
| 6,658,857 B1 * | 12/2003 | George | ............ | 62/3.3 |
| 6,723,960 B1 * | 4/2004 | DiMartino et al. | ......... | 219/386 |
| 6,947,664 B1 * | 9/2005 | Yeh | ............ | 392/405 |
| 6,995,340 B1 * | 2/2006 | Ho | ............ | 219/386 |
| 2006/0027557 A1 * | 2/2006 | Peterson et al. | ............ | 219/386 |

* cited by examiner

*Primary Examiner*—Robin O. Evans
*Assistant Examiner*—Vinod Patel
(74) *Attorney, Agent, or Firm*—Egbert Law Offices

(57) ABSTRACT

The present invention provides a thermos bag, which includes a container bag and an built-in thermos device. The thermos device includes a frame, a conductive plate, a printed electrothermal plate, an automatic temperature control device, an insulating lining and a bottom plate as a cover unit. After placing it inside the container bag, with the fixation ring sleeve, foot mount and bolts, it is positioned between the thermos device and container bag. The thermos bag made of this structure provide provides the traveler with a thermos bag that is easy to assemble, easy to carry, energy saving and easy to take off for cleaning.

5 Claims, 6 Drawing Sheets

THERMOS BAG

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a thermos bag for travel use, and more particularly to a hidden thermos device, which includes a frame, a fixation ring sleeve, a conductive plate, a printed electrothermal plate, an automatic temperature control device, insulating lining and bottom plate.

BACKGROUND OF THE INVENTION

When people travel, they usually carry some food with them in case of hunger, and among the selections of food they carry, some of them may need to be heated or be kept warm to maintain the taste, however, in terms of traveling in the car, people obviously are not going to carry an oven that is huge and heavy, and not to mentioned it uses lots of electricity.

For this reason, some businesses have developed some thermos products that are easy to carry to meet the demand, except, the typical spatial structure of the current thermos bag usually places the part with thermos device in it by a cover base, then assembles the cover base on the outside of the bottom of the bag, and in so doing, besides causing the difficulty between the cover base and bag and the problem of increasing the components, it affects the look of the bag because of the design of the cover base being exposed on the outside; therefore, there is still room for improvement.

Thus, to overcome the aforementioned problems of the prior art, it would be an advancement if the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

1. The thermos bag disclosed in the present invention primarily uses the printed electrothermal plate 50 to achieve the thermos function, because of the printed electrothermal plate is a structure of MYLAR, compare to the conventional electrothermal plate, it has the advantages such as energy saving, temperature rises fast, small and light. Therefore, the present invention has combined it into the structure of a travel bag to provide traveler a simple and convenient way for thermos heating, and make it a best friend while people travel.

2. The present invention uses the structure design of the internal heating device to place the main components of the heating device inside the container bag 10, and in so doing, it can make the positioning between the thermal device and the container bag easier to achieve (because it can use the base wall of the container bag directly as supporting surface), and reduce the numbers of component to the minimum, moreover, it can make the appearance of the container bag prettier.

3. The structure of the thermos device of the present invention comprises of a frame 20, a conductive plate 40, the printed electrothermal plate 50, an automatic temperature control device 60, an insulating lining 70 and the bottom plate 80, which makes the thermos device a single unit. Place it inside the container bag when assembling it, then with the fixation ring sleeve 30, the foot mount 90 and the bolts 92 to achieve the positioning between the thermos device and the container bag, which makes it more convenient and highly effective, and the user can easily take out the thermos device inside to clean the container bag.

4. The thermal device of the present invention uses the design of the frame 20, the insulating lining 70 and the bottom plate 80, and the effect of the printed electrothermal plate 50 and the conductive plate 40 that creates heat and increases the temperature when being operated to insulate the base wall 14 of the container bag 10, and in so doing, it creases the insulation effect when the temperature rises and can still be safe.

5. The present invention takes the through holes 91 of the foot mount 90 mentioned above and connect them to the protruding rods 83 on the bottom plate 80 through bolts 92 to achieve the positioning effect, and by assembling the foot mount 90 to make the positioning among the foot mount 90, the bottom plate and the container bag 10, which tightly secure the entire unit.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

As shown in FIGS. 1–6, there is a preferred embodiment of the thermos bag.

Figure 1:
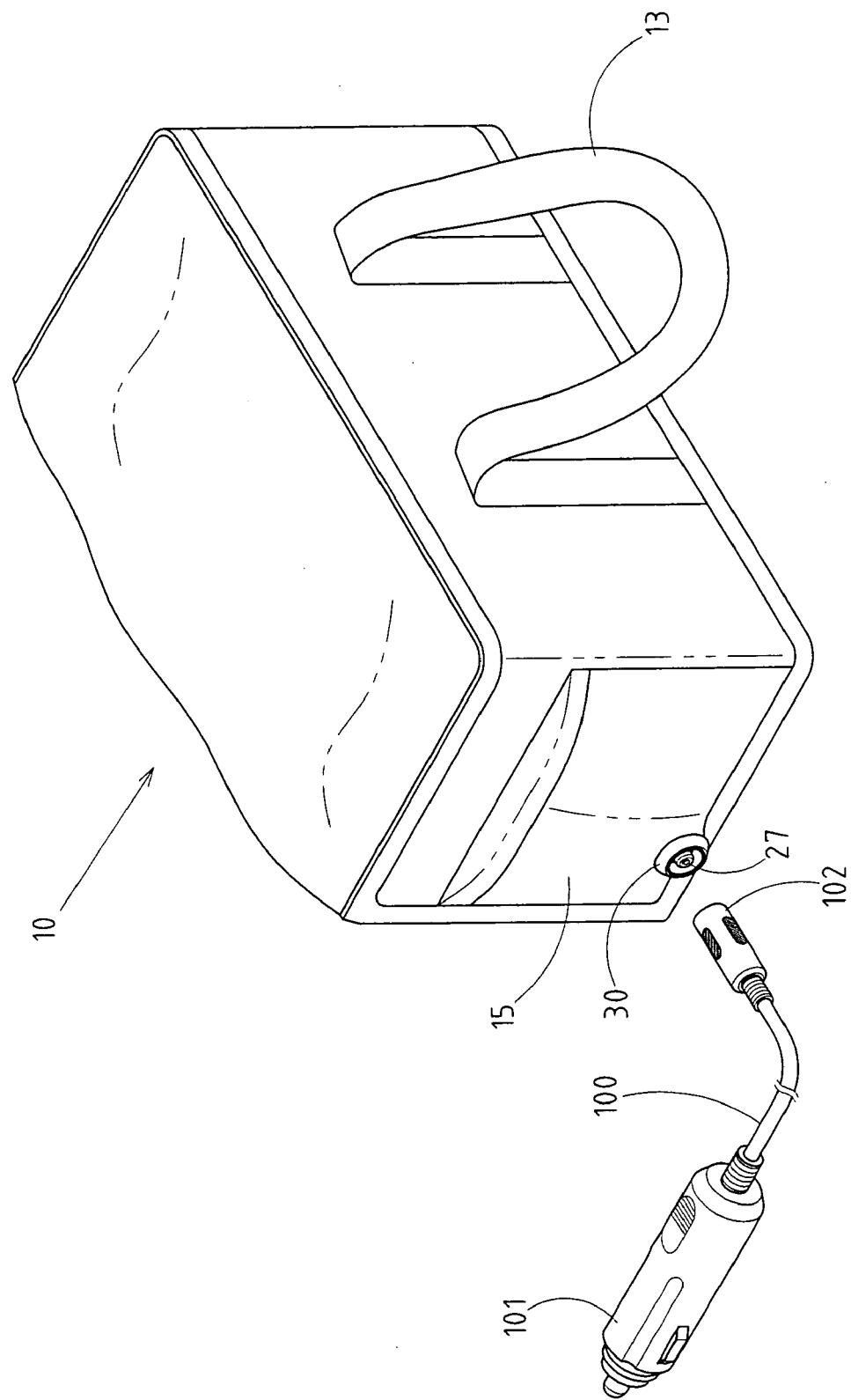
FIG. 1 shows a perspective external view of the thermos bag of the present invention.
Figure 2:
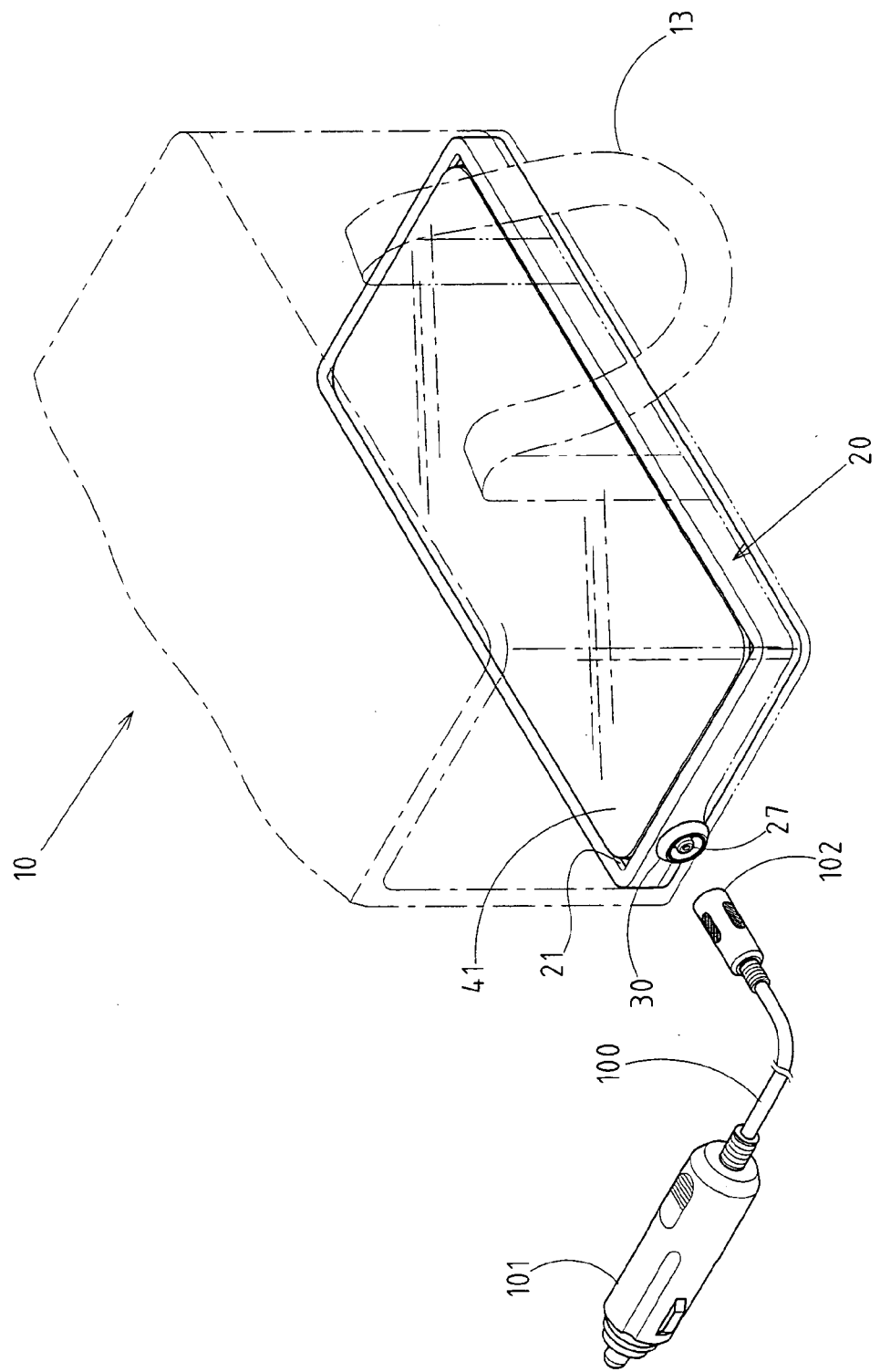
FIG. 2 shows a perspective view of the thermos bag of the present invention.
Figure 3:
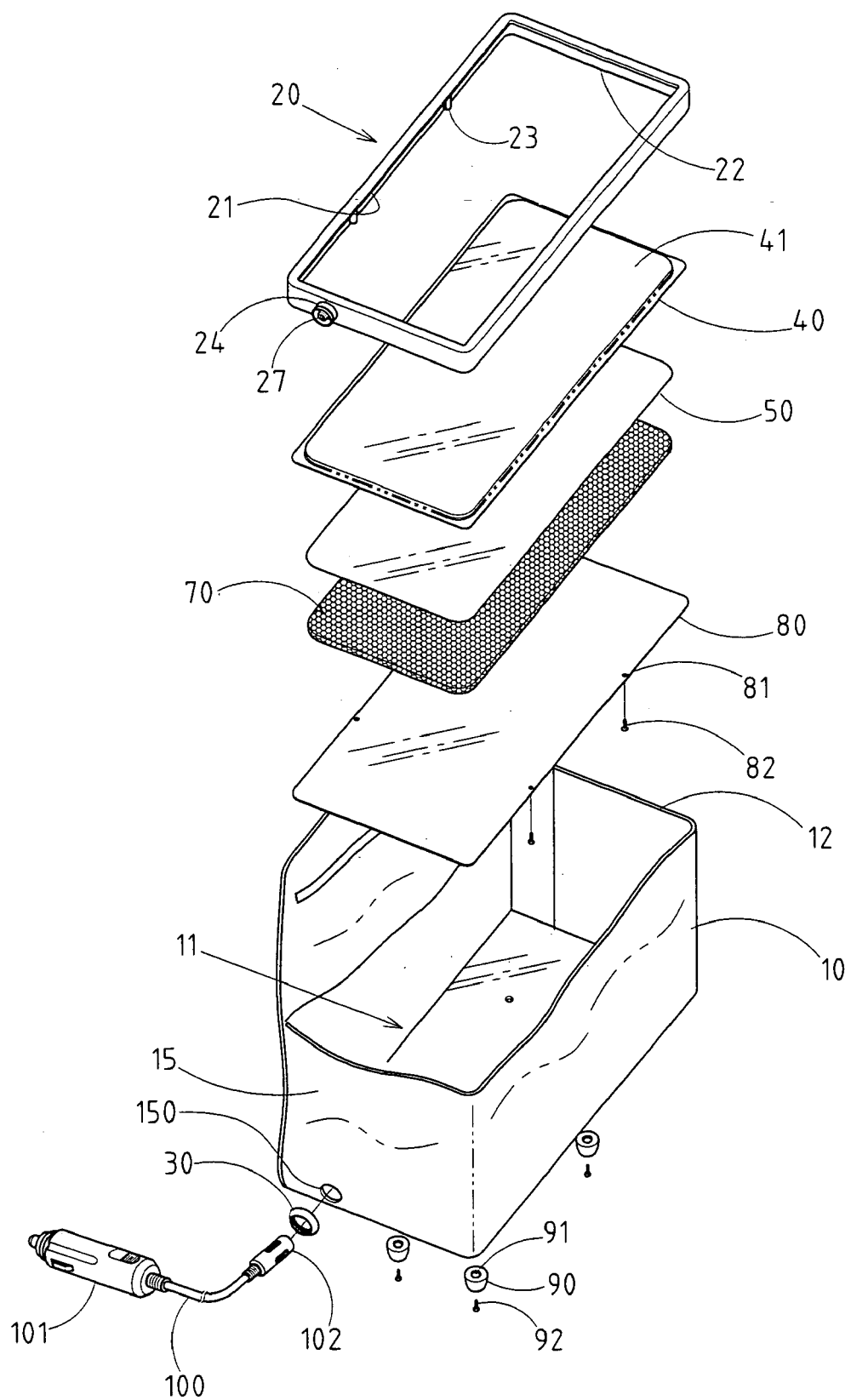
FIG. 3 shows the first exploded perspective view of the thermos bag.
Figure 4:
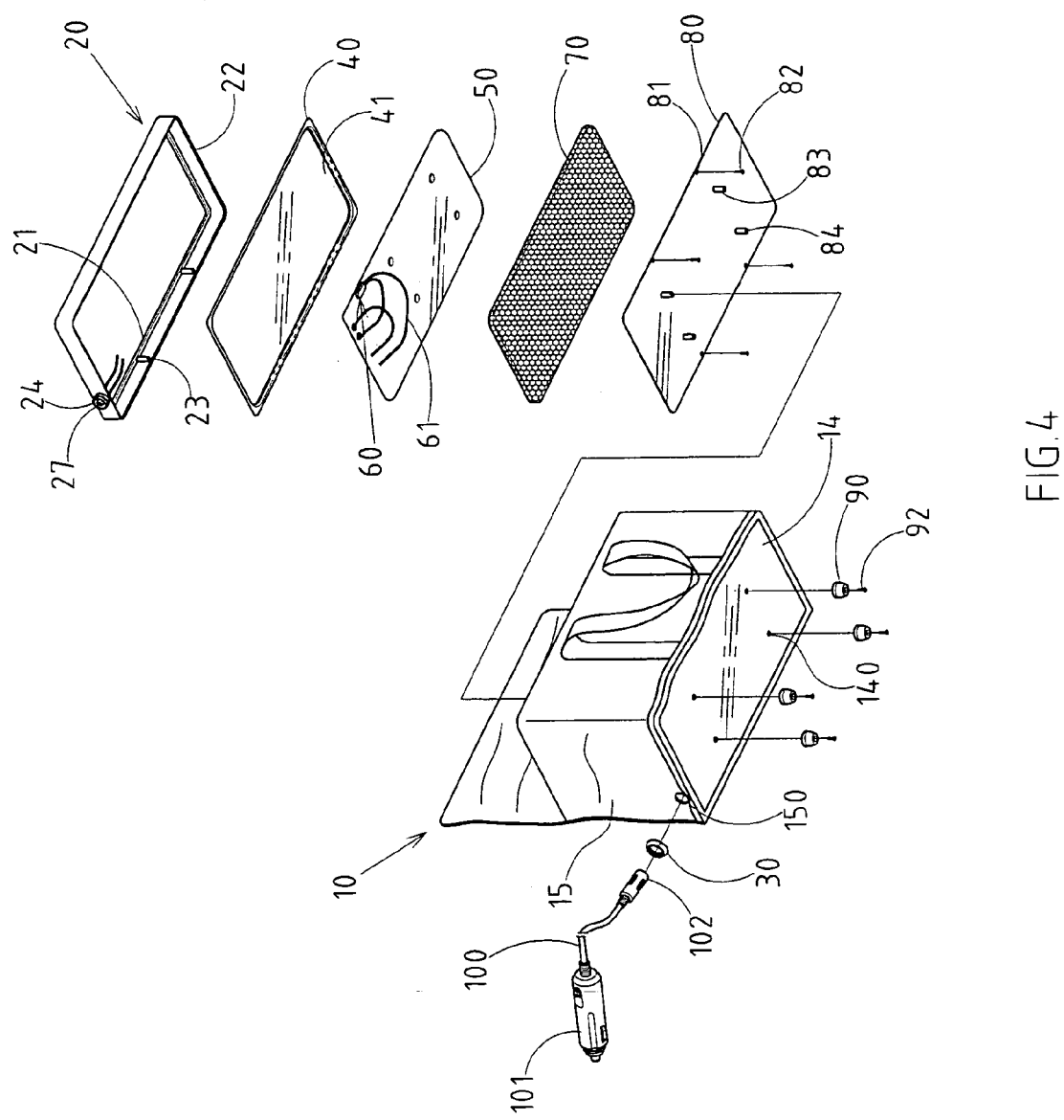
FIG. 4 shows the second exploded perspective view of the thermos bag.

The invention includes a container bag 10, which may be shaped differently; it is a square box in this embodiment, and it forms a containing space 11 inside, and the container bag has an opening 12, and the opening may be opened by the design of zipper, so the food or object may be placed inside the containing space, please see FIG. 4 for the opening condition; a handle strap 13 (such as handle or strap) may be placed on the container bag 10 in convenience of carrying the entire container with hand or on the back, and among them, the walls of the container bag 10 may be better with heat resistant material, and to respond to the heat resistance this invention must have to have "thermos function", and the base wall 14 of the container bag 10 must have several through holes 140 that are spaced apart, and one side wall 15 of the container bag 10 must have through opening 150.

The invention includes a built-in thermos device, which is to be placed at the bottom of the containing space of the container bag 10 mentioned above.

Figure 5:
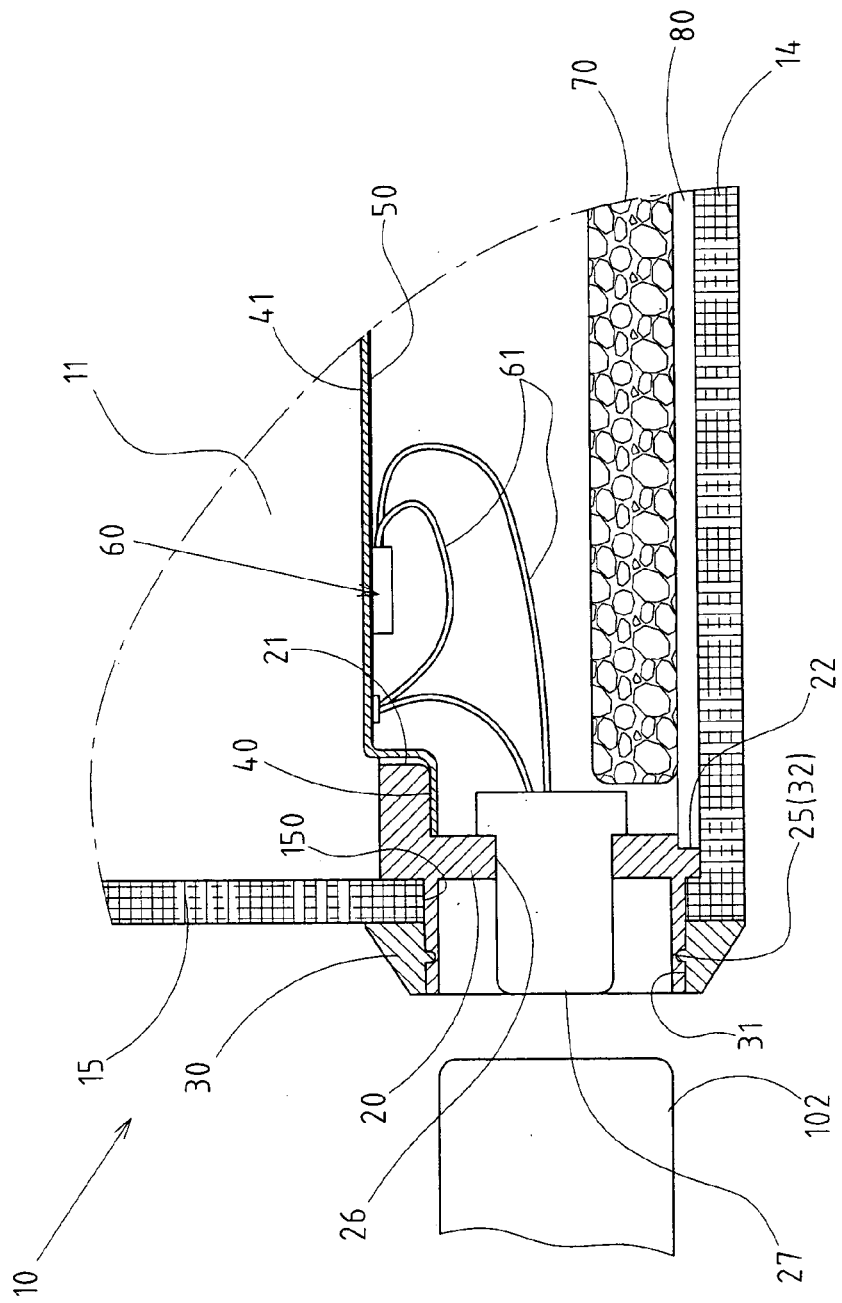
FIG. 5 shows a local sectional view of the partial thermos bag of the present invention.

There is a frame 20 with a convergent opening 21 on the top, and divergent opening 22 that have several screw tooling holes 23 on the bottom of the frame 20, and one side of the frame 20 has a protruding tube base 24 that corresponds to the through opening 150 of one side wall 15 of the container bag 10, and a concave ring edge 25 is placed on the outside of the protruding tube base 24, and a through hole 26 in the center offers a power cord socket 27 to go through (see FIG. 5).

There is also a fixation ring sleeve 30, which is ring like, and the ring hole 31 in the middle can be connected to the outside of the through opening 150 of the container bag that protruding tube base 24 on the frame 20 mentioned above comes out, and convex ring edge 32 that is in the ring hole 31 can be locked in with the concave ring edge 25 of the protruding tube base 24 (see FIG. 5).

Figure 6:
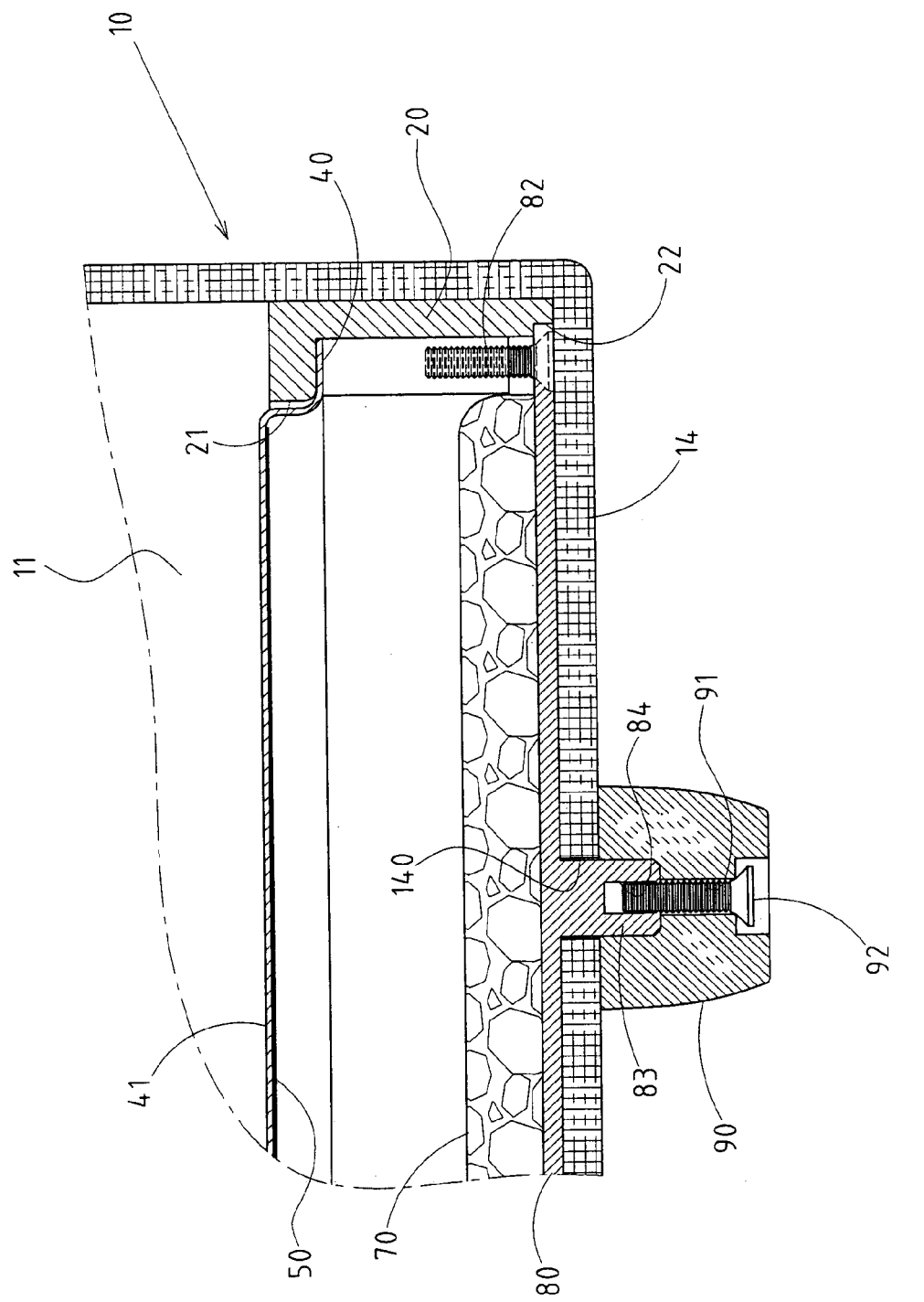
FIG. 6 shows another local sectional view of the partial thermos bag of the present invention.

The device also has a conductive plate 40, which is metal plate, has outer diameter that fits in the frame 20 mentioned above, and the conductive plate 40 has a convex surface 41 that fits the convergent opening 21 of the frame 20 (see FIG. 6).

There is a printed electrothermal plate 50, which is also called MYLAR electrothermal plate, and it is connected (such as adhesive method) to the bottom of the conductive plate 40 mentioned above, and compare to the conventional wound type electrothermal plate and etching electrothermal plate, this printed electrothermal plate 30 is has the advantages of energy saving, fast heating, small and light (see later article for detailed comparison).

An automatic temperature control device 60 is to be placed between the printed electrothermal plate 50 mentioned above and the frame 20, is connected to the printed electrothermal plate 50 and the power cord socket 27 by a conductive cable 61; the automatic temperature control device 60 shuts off automatically when the temperature reaches a certain high temperature (such as 70°), and turns on automatically when the temperature reaches a certain low temperature (such as 60°).

An insulating lining 70 is to be placed inside the printed electrothermal plate 50 mentioned above, insulates the heat generated by the printed electrothermal plate 50; and the insulating lining 70 may be made of foam and ethylene vinyl acetate copolymer (EVA).

A bottom plate 80 is to be sealed to the divergent opening 22 of the frame 20, and there are passage holes 81 on the bottom plate 80 that corresponds to the screw tooling holes 23 on the divergent opening 22 of the frame 23, which are connected by bolts 82; and there are several protruding rods 83 that are spaced out on the bottom of the bottom plate 80, which are to go through the through holes 140 of the base wall 14 of the container bag 10, and there are several screw holes 84 on the bottom of the protruding rods 83.

Several foot mounts 90 are to be placed on the base wall 14 of the container bag 10, and the foot mounts 90 mentioned above have through holes, and the top of the through hole 91 of each mount 90 can be connected to the protruding rods 83 that are on the base wall 14 of the container bag 10 through the bottom plate 80 mentioned above, and put the bolts 92 from the bottom of the foot mounts 90 through the through holes 91 of the foot mount to be locked into with the screw hole 84 of the protruding rod 83 and connect the foot mount 90 and bottom plate and container bag 10 (see FIG. 6).

There is an in-car charging cable 100, which includes a charging head 101 of a car cigarette lighter, and a conductive plug 102 of the power cord socket 27 mentioned above to be the charging components of the thermos device of the present invention.

Through the above structure and design, the thermos bag disclosed in the present invention can be used to store objects under the circumstances where the thermos functions are not used; when the heating function is desired, place the food that is desired to be heated into the containing space 11 of the container bag 10, and use the in-car charging cable 100 to connect the car cigarette lighter and power cord socket 27, and start the printed electrothermal plate 30 to heat up the food, at this time, the automatic temperature control device 60 can adjust to the temperature desired automatically to prevent overheat and to ensure the safety of using it; it makes a thermos bag that is easy to carry and easy to operate.

One point needs to be added, the detailed comparison between the printed electrothermal plate 30 and the conventional wound electrothermal plate and etching electrothermal plate:

1. Wound Electroplate: the manufacturing process is complicated, the wire design can only be series connection, no temperature coefficient, the impedance is fixed (when the temperature increases the impedance increases, therefore, it is energy consuming), and the temperature rises slowly.

2. Etching electroplate: the manufacturing process is complicated, the chemical solution has environmental issues, the wire design can only be series connection, no temperature coefficient, the impedance is fixed, therefore, the temperature rises slowly.

3. The printed electrothermal plate: the process is simple, and the wire design can be series-parallel connection, and it has temperature coefficient, and the impedance is in direct proportion with the temperature (when the temperature increases, the impedance decreases, therefore, it is energy saving), the temperature rises fast.

Therefore, the thermos bag in the present invention uses the printed electrothermal plate to be its thermos device, which has the advantages such as energy saving, temperature rises fast, small and light.

We claim:

1. A thermos bag for travel use, comprising:
    a container bag, forming a containing space inside, said container bag having an opening for an object to be placed inside, a base wall having several through holes spaced apart, and one side wall having a through opening;
    an built-in thermos device, placed at a bottom of the containing, wherein said thermos device comprises:
        a frame with a convergent opening on a top thereof, and a divergent opening having several screw tooling holes on a bottom of the frame, one side of the frame having a protruding tube base that corresponds to the through opening of said one side wall, a concave ring edge placed on an outside of a protruding tube base, and a through hole in a center offering a power cord socket to go through;

a fixation ring sleeve, having a ring shape, and a ring hole in a middle thereof connected to an outside of the through opening of the container bag, a protruding tube base on the frame extending out, a convex ring edge in the ring hole being locked in with the concave ring edge of the protruding tube base;

a conductive plate being a metal plate and having an outer diameter fitted in the frame, and a convex surface fitted in the convergent opening of the frame;

a printed electrothermal plate, connected to the bottom of the conductive plate;

an automatic temperature control device, placed between the printed electrothermal plate and the frame and connected to the printed electrothermal plate and a power cord socket by a conductive cable; and an insulating lining, being placed inside the printed electrothermal plate and insulating heat generated by the printed electrothermal plate;

a bottom plate, being sealed to the divergent opening of the frame and being comprised of passage holes on the bottom plate that corresponds to the screw tooling holes on the divergent opening of the frame, which are connected by bolts; and there are several protruding rods that are spaced out on the bottom of the bottom plate, which are to go through the through holes on the base wall of the container bag, and there are several screw holes on the bottom of the protruding rods;

several foot mounts, being placed on the base wall, the foot mounts having through holes, and a top of the through hole of each mount being connected to the protruding rods that are on the base wall through the bottom plate, bolts being placed from the bottom of the foot mounts through the through holes of the foot mount to be locked into with the screw hole of the protruding rod and connect the foot mount and bottom plate and container bag; and an in-car charging cable having a charging head of a car cigarette lighter, and a conductive plug of the power cord socket.

2. The structure defined in claim 1, wherein said container bag has a handle strap.

3. The structure defined in claim 1, wherein the wall of the container bag is better if made with heat resistant materials.

4. The structure defined in claim 1, wherein the automatic temperature control device shuts off when the temperature reaches a certain high temperature, and turns on when the temperature reaches a certain low temperature.

5. The structure defined in claim 1, wherein the insulating lining can be comprised of foam and ethylene vinyl acetate copolymer (EVA).

\* \* \* \* \*